(12) United States Patent
Morris (10) Patent No.: US 6,869,239 B2
(45) Date of Patent: Mar. 22, 2005

(54) COMPACT KEYBOARD WITH SLIDING MOTION KEY ACTUATION

(76) Inventor: Charles Albert Morris, 1328 Holmes, Springfield, IL (US) 62704

( * ) Notice: Subject to any disclaimer, the term of this patent is extended or adjusted under 35 U.S.C. 154(b) by 0 days.

(21) Appl. No.: 10/413,923

(22) Filed: Apr. 15, 2003

(65) Prior Publication Data

US 2004/0013457 A1 Jan. 22, 2004

Related U.S. Application Data

(60) Provisional application No. 60/372,378, filed on Apr. 15, 2002.

(51) Int. Cl.[7] .................................................. B41J 5/10
(52) U.S. Cl. ..................... 400/488; 400/489; 400/479.1; 400/491.3; 345/168; 345/184; 341/22; 341/27; 341/33; 341/34; 341/35
(58) Field of Search ............................. 400/88, 82, 89, 400/90, 477, 479, 479.1, 488, 489, 491.3, 496, 685, 691, 717; 361/680; 341/22, 27, 33, 34, 35, 23; 345/168, 169, 172, 184; 235/145 R, 145 A; 200/5 A (56) References Cited

U.S. PATENT DOCUMENTS

| | | | | |
|---|---|---|---|---|
| 4,071,691 A | * | 1/1978 | Pepper, Jr. .............. 178/18.05 |
| 4,103,252 A | * | 7/1978 | Bobick .......................... 331/48 |
| 4,476,463 A | * | 10/1984 | Ng et al. .................... 345/174 |
| 4,495,485 A | * | 1/1985 | Smith ........................... 341/33 |
| 4,550,221 A | * | 10/1985 | Mabusth .................. 178/18.06 |
| 4,680,430 A | * | 7/1987 | Yoshikawa et al. ......... 345/174 |
| 4,736,191 A | * | 4/1988 | Matzke et al. ............... 341/20 |
| 4,743,895 A | * | 5/1988 | Alexander .................. 345/174 |
| 5,181,024 A | * | 1/1993 | Tsunoda et al. ....... 340/825.69 |
| 5,245,321 A | * | 9/1993 | Franz et al. ................ 345/172 |
| 5,497,151 A | * | 3/1996 | Dombroski ................. 341/22 |
| 5,733,056 A | * | 3/1998 | Meagher .................... 400/472 |
| 5,748,185 A | * | 5/1998 | Stephan et al. ............. 345/173 |
| 6,059,470 A | * | 5/2000 | Myint ........................ 400/488 |
| 6,174,097 B1 | * | 1/2001 | Daniel ....................... 400/472 |
| 6,262,717 B1 | * | 7/2001 | Donohue et al. ........... 345/173 |
| 2002/0158845 A1 | * | 10/2002 | Anderson ................... 345/168 |
| 2004/0061683 A1 | * | 4/2004 | Mochizuki et al. ......... 345/168 |

* cited by examiner

Primary Examiner—Leslie J. Evanisko (57) ABSTRACT

A keyboard allowing typists to use approximate QWERTY finger movements on a more compact, collapsible, and portable keyboard. The keyboard size is made more compact by using thin capacitance-responsive surfaces as key switches for the rows above and below the home row. The bottom, space-bar row is also touch-sensitive and is placed on the side of the keyboard facing the typist. The capacitance-responsive surface for the row of keys switches above the home row has a convex profile, and the capacitance-responsive surface for the row of keys switches below the home row has a concave profile, such that the keyboard can fold compactly upon itself. The home row retains depressible key switches in order to provide standard rest positions for the fingers. Characters and commands assigned to the rows above and below the home row are engaged by sliding the fingers over the capacitance-responsive surfaces adjacent to the home row.

40 Claims, 8 Drawing Sheets

COMPACT KEYBOARD WITH SLIDING MOTION KEY ACTUATION

I claim benefit of the provisional application No. 60/372,378, filed Apr. 15, 2002.

BACKGROUND OF THE INVENTION

The present invention relates to a compact, collapsible keyboard.

In the prior art, various compact, folding QWERTY keyboards have been proposed for use with mobile telephones, electronic organizers, and portable computers. Collapsible keyboards that employ mechanical, depressible key switches are constrained in size reduction by the bulk of these switches. In U.S. Pat. No. 6,174,097, a standard sized QWERTY keyboard is folded on three parallel axes, collapsing four rigid subframes of the keyboard to offer folded dimensions measuring a quarter of its unfolded width. However, the thickness of the keyboard is quadrupled when folded, and its potential size reduction is limited by its exclusive use of mechanical, depressible key switches.

Furthermore, such keyboards, when unfolded, demand large surface areas upon which to rest. As portable computer sizes have decreased, computer users have been able to employ these devices in situations that do not offer substantial desk or tabletop space. However, the size of standard QWERTY keyboards, foldable or otherwise, precludes their use in many of these situations. In such situations, typist must resort to the use of substantially smaller keyboards that only allow typing with the thumbs, with individual fingers, or with a stylus.

In U.S. Pat. No. 6,262,717, the entire keyboard is comprised of capacitance-responsive surfaces. In this way, substantial size reduction is achieved; however, this purely capacitance-responsive keyboard does not allow the fingers to rest on home keys, and, therefore, does not allow the use of familiar QWERTY style finger movements.

U.S. Pat. No. 5,497,151 attempts to reduce keyboard size by tightly interspersing the keys traditionally operable by the fingers of a person's left hand with the keys traditionally operable by the person's right hand. This proposal affords some reduction in size but is designed for single-handed typing and does not allow standard two-handed QWERTY typing.

It would be advantageous to provide a more compact keyboard offering the option of using both hands in the familiar QWERTY mode of typing. The present invention in a preferred embodiment offers two-handed typing in approximate QWERTY mode, while reducing the dimensions of the keyboard both in its folded and unfolded states.

BRIEF SUMMARY OF THE INVENTION

It is an object of the invention to provide a more compact QWERTY keyboard by reducing the number of mechanical, depressible key switches, using instead, capacitance-responsive surfaces as key switches for actuating characters and commands assigned to the rows above and below the home row. The home row employs mechanical, depressible key switches in order to provide rest positions for the fingers. This new configuration will allow typists to use approximately the same finger movements as they would use on a standard, full-size QWERTY keyboard, while taking advantage of thin space-saving capacitance-responsive surfaces.

It is a farther object of the invention to provide audible or vibratory feedback indicating the engagement of one of the capacitance-responsive key switches in order to alert the keyboard operator each time a character or command has been engaged.

It is a further object of the invention to provide the keyboard operator the ability to reprogram the active areas of the capacitance-responsive surfaces designated to engage specific characters and commands in terms of their proximity to the home row of depressible key switches. By moving these active areas further away from the home row, the keyboard operator can lessen the sensitivity of the keyboard to drifting fingers that have moved without the intention of engaging a character or command. As typists become more proficient with this manner of typing, they can reprogram the keyboard, shifting the active areas closer to the home row in order to engage characters and commands with minimized finger movements.

It is a further object of the invention to provide the keyboard operator with the ability to sue the capacitance-responsive surfaces as relative motion cursor positioning devices when such operation is selected.

It is a further object of the invention to provide greater reduction in size by using a vertically oriented, thin, capacitance-responsive surface for the row that contains the space-bar and command key switches. Due to its vertical orientation, this row will not add substantially to the overall size of the keyboard.

It is a further object of the invention to provide optimum size reduction and portability by housing the capacitance-responsive surface for the row of key switches below the home row within a surface with a concave profile that is designed to fold compactly upon a complementary convex surface housing the home row and the capacitance-responsive surface for the row of key switches above the home row.

It is a further object of the invention to provide further size reduction and portability by connecting the left half of the keyboard to the tight half by way of a hinge, such that the two halves can be folded together for compact storage.

It is a further object of the invention to provide a modified form of construction of the keyboard in which the left and right halves of the keyboard are separately housed and are each separately attached by way of a pivot to a computerized device such that they can be folded up an rotated into a stored position within the computerized device.

It is a further object of the invention to provide a modified form of construction of the keyboard in which the four rows of key switches are contained within two semi-cylindrical convex surfaces which are hinged to each other and which when closed together form an approximately cylindrical shape. The uppermost row of capacitance-responsive key switches is located within the far side, relative to the typist, of the semi-cylindrical surface further from the typist, and the upper-middle, home row of depressible key switches is located within the near side, relative to the typist, of the semi-cylindrical surface further from the typist. The lower-middle row of capacitance-responsive key switches is located within the far side, relative to the typist, of the semi-cylindrical surface closer to the typist, and the bottom row of capacitance-responsive key switches is located within the near side, relative to the typist, of the semi-cylindrical surface closer to the typist. In this variation, the hollow space of the cylindrically shaped closed keyboard can house a flexible, extractable, and retractable video screen which can be unfurled from within the closed keyboard and which can be used in conjunction with the opened keyboard.

It is a further object of the invention to provide a more ergonomic keyboard by allowing a majority of characters and commands to be engaged by sliding the fingers over capacitance-responsive surfaces rather than requiring the typist to reach for and push down mechanical keys.

BRIEF DESCRIPTION OF THE SEVERAL VIEWS OF THE DRAWING

The present invention will be more fully understood by reference to the following detailed descriptions thereof when read in conjunction with the attached drawings, and wherein.

DETAILED DESCRIPTION OF THE INVENTION

Figure 1:
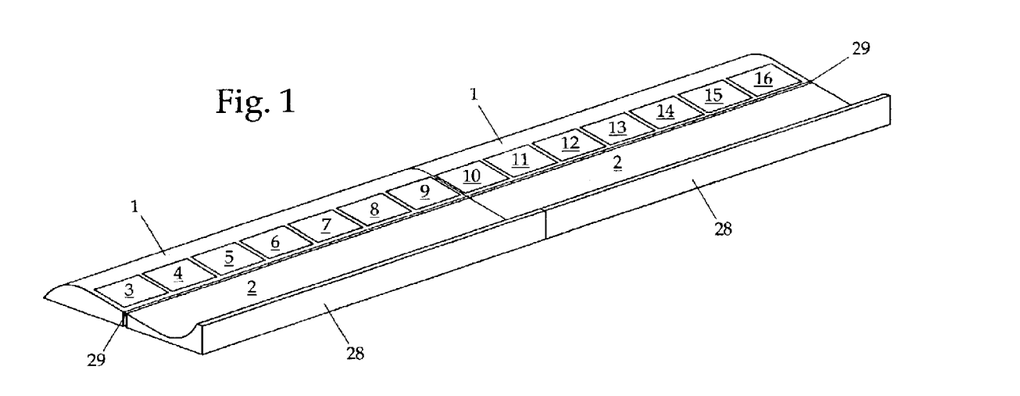
FIG. 1 is a perspective view of a preferred embodiment of the keyboard.

In FIG. 1, there is shown a perspective view of the keyboard showing the arrangement of the rows of capacitance-responsive key switches 1, 2, and 28 and the single row of mechanical, depressible key switches 3–16. Number 1 is the row of capacitance-responsive surfaces that provide key switches for actuating characters and commands assigned to spaces in the uppermost row of the keyboard. Numbers 3–16 are the mechanical, depressible key switches for actuating characters and commands assigned to spaces in the home row of the keyboard. The home row retains mechanical, depressible key switches 3–16 in order to provide standard rest positions for the fingers. Number 2 is the row of capacitance-responsive surfaces that provide key switches for actuating characters and commands assigned to spaces in the row below the home row. Number 28 is the row of capacitance-responsive surfaces that provide key switches for actuating the space-bar and assorted computer commands.

This keyboard is particularly useful for providing a more compact and portable keyboard. Firstly, instead of using mechanical, depressible key switches for the row above the home row, this keyboard employs a less space consuming convex row of capacitance-responsive surfaces 1 that curves downward from the elevation of the home row of mechanical, depressible keys 3–16. Specific characters and commands are assigned to distinct areas of this row of capacitance-responsive surfaces 1. A character or command is engaged when an individual fingers slides out across or taps the portion of the row of capacitance-responsive surfaces 1 to which the character or command is assigned. Using existing capacitance-responsive technology, individual characters and commands will be actuated each time the typist's finger touches or slides over and back across a specific portion of the keyboard's capacitance-responsive surfaces.

Secondly, instead of using mechanical, depressible key switches for the row below the home row, this keyboard employs a less space consuming concave row of capacitance-responsive surfaces 2 that curves first downward then upward from the elevation of the home row of key switches 3–16. Specific characters and commands are assigned to distinct areas of this row of capacitance-responsive surfaces 2. A character or command is engaged when an individual fingers slides out across or taps the portion of the row of capacitance-responsive surfaces 2 to which the character or command is assigned.

These specified portions of the capacitance-responsive surfaces 1 and 2 are adjustable, such that the keyboard operator can electronically reprogram the keyboard to place these portions further away or closer to the home row. In this way, the keyboard operator can make the keyboard less sensitive or more sensitive to finger movements away from the home row.

Thirdly, instead of using mechanical, depressible key switches for the row containing the space-bar and command keys, this keyboard employs a row of capacitance-responsive surfaces 28 that is substantially vertical in relation to the horizontal keyboard, with its highest elevation meeting the highest elevation of the row of concave capacitance-responsive surfaces 2. This vertical row of capacitance-responsive surfaces 28 adds only minimally to the overall dimensions of the keyboard. Specific commands are assigned to distinct areas of this row of capacitance-responsive surfaces 28. A command is engaged when a thumb or finger taps the portion of the row of capacitance-responsive surfaces 28 to which the command is assigned.

An audible tone or a vibration in the keyboard signals typists to indicate that a key switch has been engaged in a capacitance-responsive surface 1, 2, or 28.

Fourthly, the capacitance-responsive surfaces 1 and 2 can alternately be used as relative motion cursor positioning devices when such operation is selected.

Fifthly, the home row doubles as a number row when the number lock switch 3 is engaged. The number row of mechanical, non-depressible key switches found on a standard QWERTY keyboard is thus eliminated.

With these space-saving innovations, the keyboard is substantially narrower from front to back than previously proposed compact two-handed QWERTY keyboards.

Figure 4:
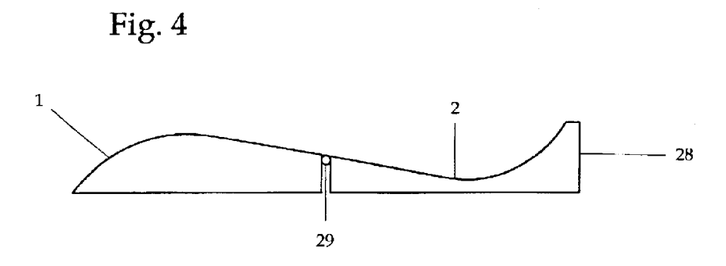
FIG. 4 is an elevation view of the keyboard shown in FIG. 1.
Figure 5:
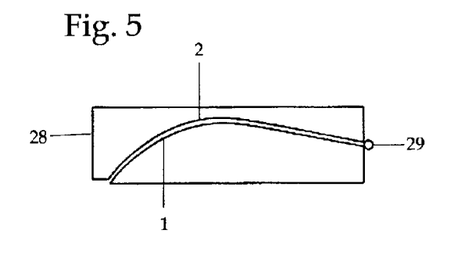
FIG. 5 is an elevation view of the keyboard shown in FIG. 1 with its concave section folded upon its convex section.

Sixthly, the lower section of each half of the keyboard folds by way of hinge 29 onto the corresponding upper section, with the concave row of capacitance-responsive surfaces 2 folding neatly upon the home row of key switches 3–16 and the convex row of capacitance-responsive surfaces 1. In FIG. 4, there is shown an elevation view of the keyboard in its open, operating position. In FIG. 5, there is shown an elevation view of the keyboard with its lower concave half folded compactly by way of hinge 29 upon the upper convex half of the keyboard.

Figure 3:
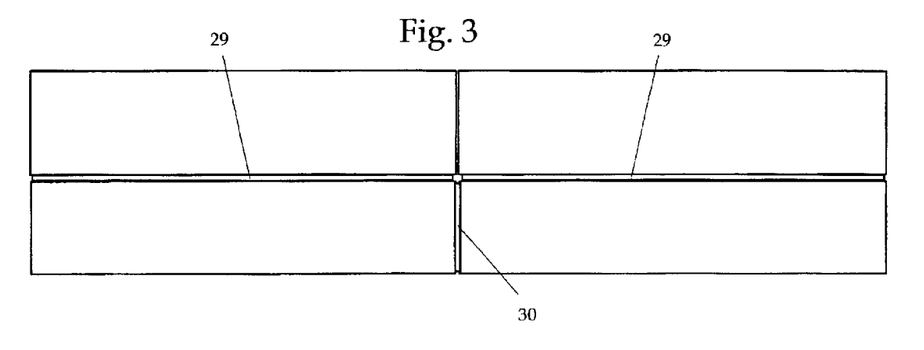
FIG. 3 is a plan view of the underside of the keyboard shown in FIG. 1.
Figure 6:
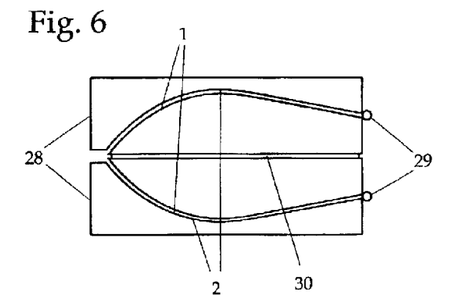
FIG. 6 is an elevation view of the keyboard shown in FIG. 1 with its concave section folded upon its convex section and with its right half folded upon its left half.

Seventhly, the left and right halves of the keyboard can be folded together by way of hinge 30, which connects the upper left section of the keyboard to the upper right section. In FIG. 3 there is shown a plan view of the underside of the keyboard showing the hinge 30 between the upper sections of the left and right halves of the keyboard. In FIG. 6, there is shown an elevation view of the keyboard with its lower half folded upon its upper half and with its left half folded by way of hinge 30 upon its right half. And although the keyboard folds four rigid subframes upon each other, the resulting thickness of the folded keyboard is substantially less than four times its unfolded thickness due to the complementary curves of the convex row of capacitance-responsive surfaces 1 and the concave row of capacitance-responsive surfaces 2.

Figure 2:
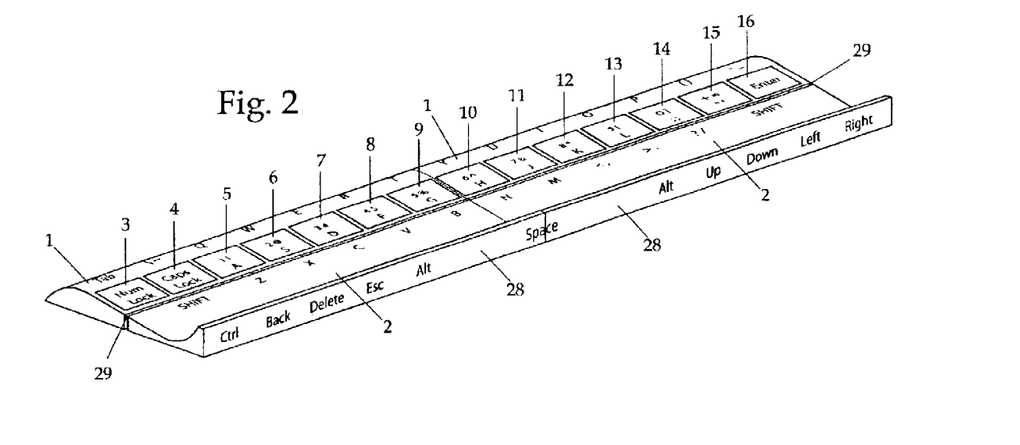
FIG. 2 is a perspective view of the keyboard shown in FIG. 1 with a preferred QWERTY style layout of alphanumeric characters and computer commands.

Additionally, since a majority of characters and commands are engaged by sliding the fingers over the rows of capacitance-responsive surfaces 1 and 2 rather than reaching for and pushing down mechanical keys, this keyboard will reduce repetitive stress, thus offering ergonomic benefit. In FIG. 2, there is shown a possible QWERTY layout of alphanumeric characters and computer commands for the keyboard.

Figure 7:
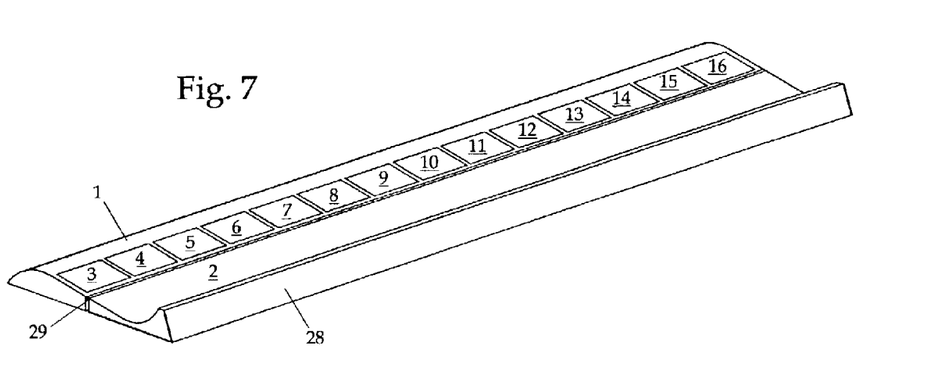
FIG. 7 is a perspective view of a modified form of construction of the keyboard in accordance with the present invention in which the lowermost row of key switches are housed within an angled surface.

In FIG. 7 there is shown a further example of the keyboard that employs a surface that slopes at an angle to house the row of capacitance-responsive surfaces 28 for the lowermost row. This arrangement adds to the dimensions of the keyboard but allows the thumb to more easily engage the row of capacitance-responsive surfaces 28. With the typist's thumbs taking a home position approximately an eighth of an inch away from the row of capacitance-responsive surfaces 28, resting on the table in front of the keyboard, the typist flicks the thumb forward, tapping specific areas of the tow of capacitance-responsive surfaces 28 to engage the space-bar and other commands. By setting the row of capacitance-responsive surfaces 28 at an angle, the thumb easily bits the middle of the row of capacitance-responsive surfaces 28 rather than the upper edge of the row of capacitance-responsive surfaces 28.

Figure 8:
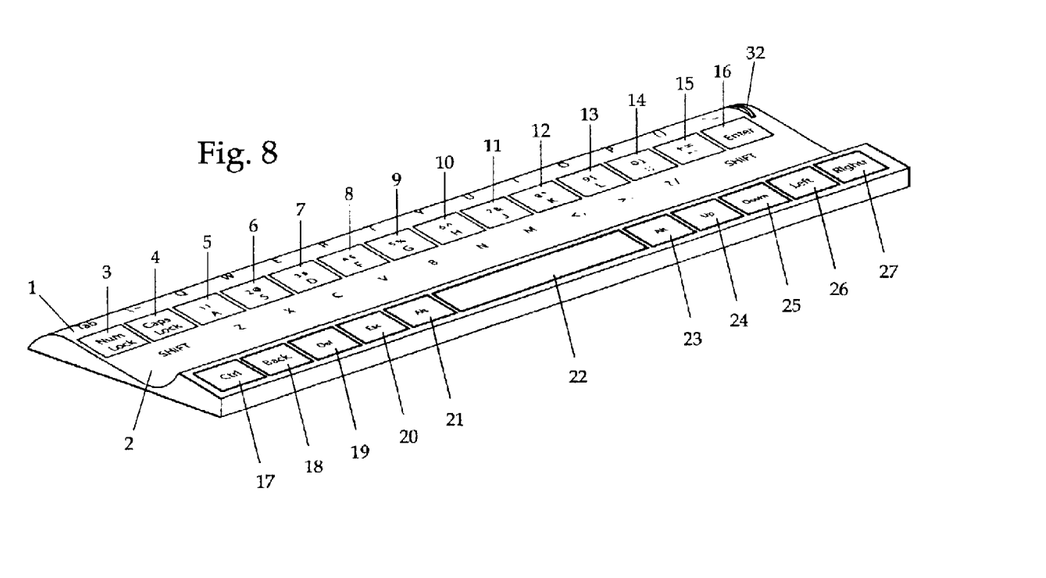
FIG. 8 is a perspective view of a further modified form of construction of the keyboard in accordance with the present invention in which the switches within the lowermost row of key switches are depressible.

In FIG. 8 there is shown a further example of the keyboard; in this example of the keyboard, numbers 17–27 are depressible key switches for actuating the space-bar 22 and assorted computer commands. Number 32 is a scroll wheel which when rotated engages commands for scrolling up and down computer documents.

Figure 9:
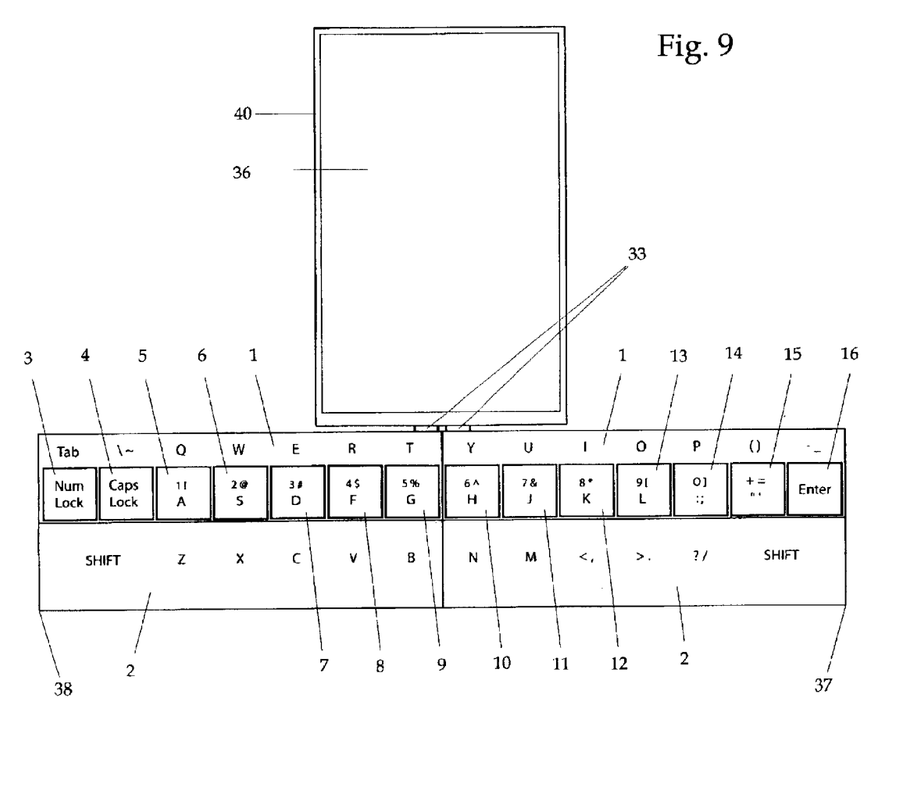
FIG. 9 is a plan view of a still further modified form of construction of the keyboard in accordance with the present invention in which the left and right halves of the keyboard are separately housed and are each separately attached by way of a pivot to a computerized device such that they can be folded up an rotated into a stored position within the computerized device.
Figure 10:
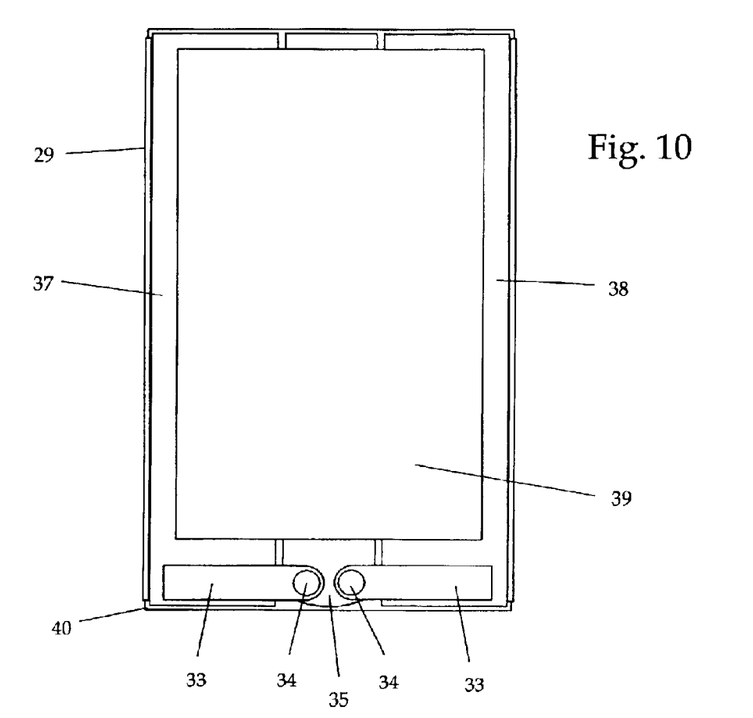
FIG. 10 is a plan view of the underside of the keyboard and computerized device shown in FIG. 9.
Figure 11:
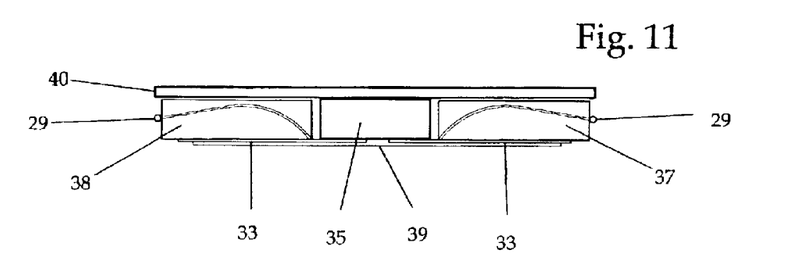
FIG. 11 is an elevation view of the keyboard and computerized device shown in FIG. 9.

In FIG. 9 there is shown a further example of the keyboard with its left half 38 separate and distinct from its right half 37, and with both halves attached by way of pivoting brackets 33 to a handheld computerized device. The body of the computerized device 35 is shown in FIG. 10, a plan view of the underside of this example of the keyboard. The pivoting brackets are each attached to the body of the computerized device 35 by a bolt 34. FIG. 11 shows an elevation view of this example of the keyboard. Number 40 is the frame for the screen 36 of the computerized device. Number 39 is the protective plate on the underside of the computerized device. The left half 38 and the right half 37 of the keyboard can each be stored between the frame for the screen 40 and the protective plate 39, and each can be rotated out by way of a pivot 33 and unfolded by way of hinge 29 for use in conjunction with the computerized device.

Figure 12:
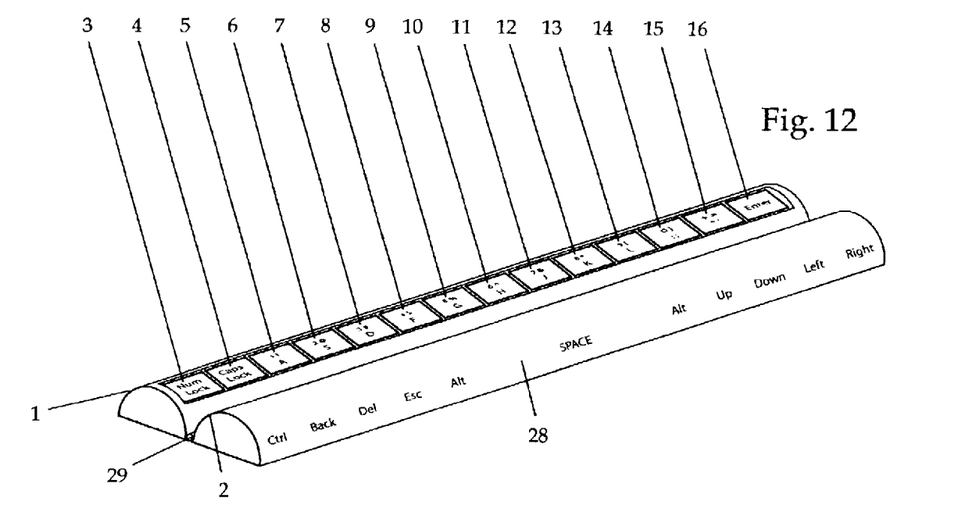
FIG. 12 is a perspective view of a yet still further modified form of construction of the keyboard in accordance with the present invention in which the four rows of key switches are housed within two semi-cylindrical surfaces.

In FIG. 12 there is shown a further example of the keyboard that employs two semi-cylindrical halves that fold by way of hinge 29 to form a portable cylinder. A preferred QWERTY layout of letters and commands is shown. In this example of the keyboard, the row of capacitance-responsive surfaces 1 provides key switches for actuating characters and commands assigned to spaces in the uppermost row of the keyboard. Numbers 3–16 are the mechanical, depressible key switches for actuating characters and commands assigned to spaces in the upper-middle home row of the keyboard. The home row retains mechanical, depressible key switches 3–16 in order to provide standard rest positions for the fingers. Number 2 is the row of capacitance-responsive surfaces that provides key switches for actuating characters and commands assigned to spaces in the row below the home row. Number 28 is the row of convex capacitance-responsive surfaces that provides key switches for actuating the space-bar and assorted computer commands.

Figure 13:
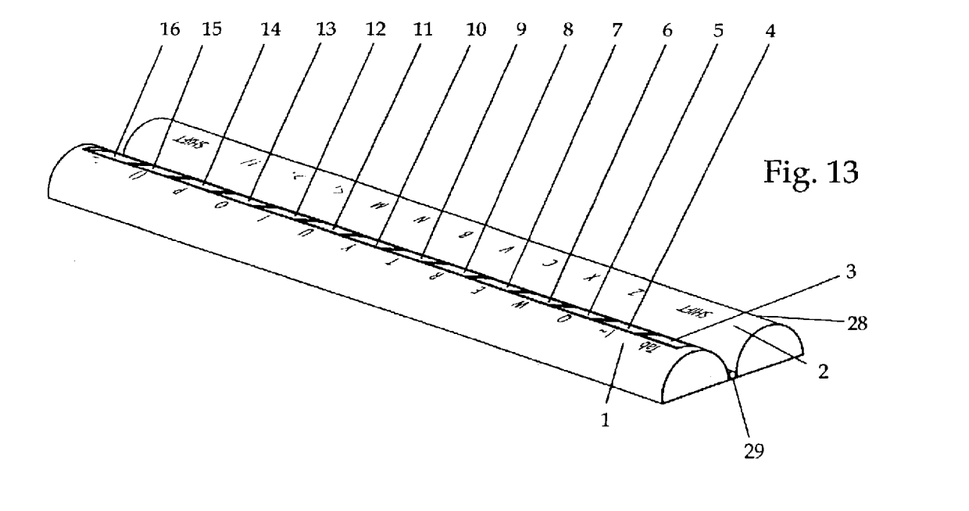
FIG. 13 is a perspective view of the obverse side of the example of the keyboard shown in FIG. 12.

In FIG. 13 there is shown the obverse side of the further example of the keyboard shown in FIG. 12. A preferred QWERTY layout of letters and commands is shown.

Figure 14:
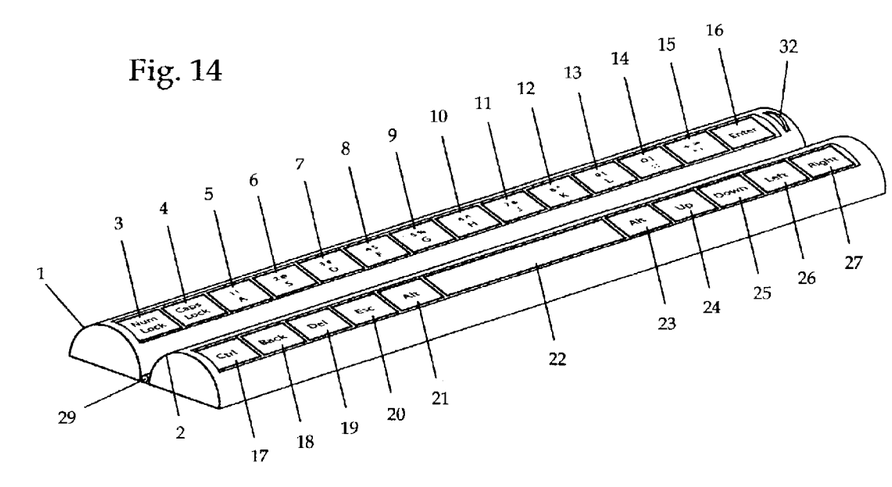
FIG. 14 is a perspective view of an even further modified form of construction of the keyboard in accordance with the present invention in which the four rows of key switches are housed within two semi-cylindrical surfaces, and wherein the key switches within the lowermost row of key switches are depressible.

FIG. 14 shows a further example of the keyboard that employs two semi-cylindrical halves that fold by way of hinge 29 to form a portable cylinder. A preferred QWERTY layout of letters and commands is shown. In this example of the keyboard, numbers 17–27 are depressible key switches for actuating the space-bar and assorted computer commands assigned to the lowermost row of key switches. Number 32 is a scroll wheel which when rotated engages commands for scrolling up and down computer documents.

Figure 15:
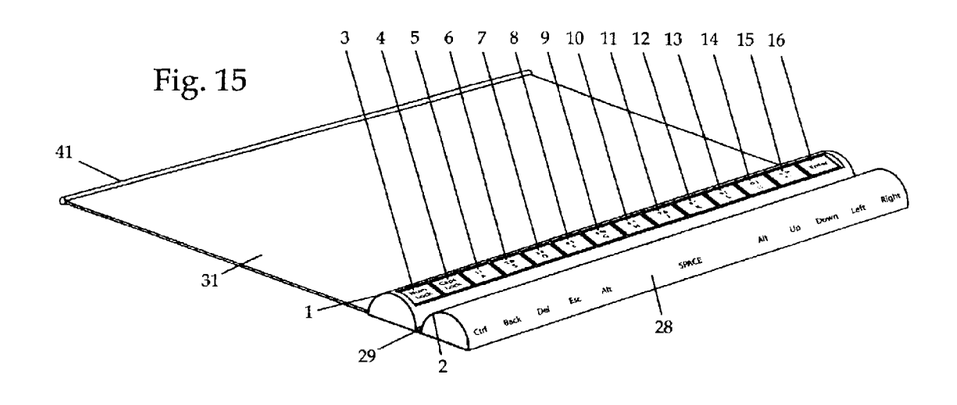
FIG. 15 is a perspective view of a still even further modified form of construction of the keyboard in accordance with the present invention in which the four rows of key switches are housed within two semi-cylindrical surfaces, and wherein the key switches within the lowermost row of key switches are depressible, and wherein a display screen is attached.
Figure 16:
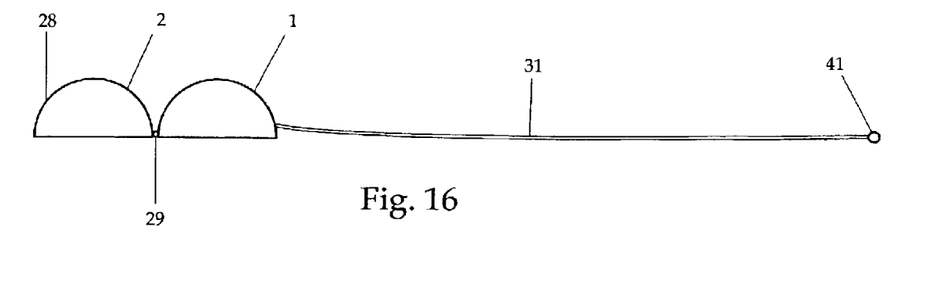
FIG. 16 is an elevation view of the keyboard shown in FIG. 15 with its screen extended.
Figure 17:
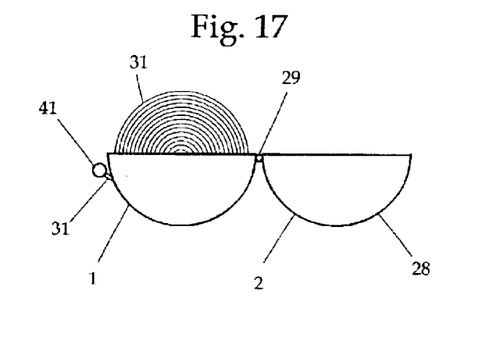
FIG. 17 is an elevation view of the keyboard shown in FIG. 15 with its two semi-cylindrical halves open and its screen retracted.
Figure 18:
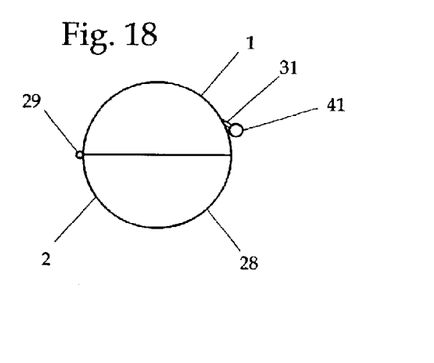
FIG. 18 is an elevation view of the keyboard shown in FIG. 15 with its screen retracted and its two semi-cylindrical halves closed together.

In FIG. 15 there is shown a further example of the keyboard that employs two semi-cylindrical halves that fold to form a portable cylinder, and in which a retractable, flexible computer screen 31 is seen unfurled for use in conjunction with the keyboard. Number 41 is the handle for the computer screen 31. This example of the keyboard employs a row of capacitance-responsive surfaces 28 to provide key switches for the lowermost row of key switches. FIG. 16 shows an elevation view of this example of the keyboard. FIG. 17 shows this example of the keyboard with the computer screen 31 retracted and rolled up for storage. FIG. 18 shows this example of the keyboard with the two semi-cylindrical halves folded together to form a portable cylinder with the computer screen 31 stored inside.

Figure 19:
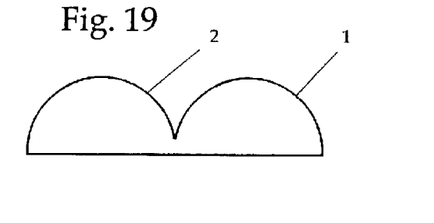
FIG. 19 is an elevation view of a yet still even further modified form of construction of the keyboard in accordance with the present invention in which the four rows of key switches are housed within two semi-cylindrical surfaces attached to each other to form a single unit.

FIG. 19 shows an elevation view of a further example of the keyboard that employs two semi-cylindrical halves fused together to form a single unit. In this example of the keyboard, depressible key switches are used in the upper-middle home row of key switches, and in the lowermost row of key switches.

Figure 20:
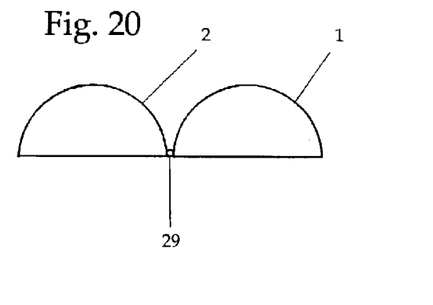
FIG. 20 is an elevation view of the keyboard shown in FIG. 14.

FIG. 20 shows an elevation view of a further example of the keyboard that employs two semi-cylindrical halves that fold by way of hinge 29 to form a portable cylinder. In this example of the keyboard, depressible key switches are used in the upper-middle home row of key switches, and in the lowermost row of key switches.

I claim:

1. A keyboard for controlling data input of alphanumeric characters and other commands including in combination:
    an uppermost row of key switches;
    an upper-middle, home row of key switches;
    a lower-middle row of key switches;
    a lowermost row of key switches;
    said uppermost row having capacitance-responsive key switches, said capacitance-responsive key switches being separately operable for actuating alphanumeric characters and other commands and being located within specific, assigned areas of convexly curved capacitance-responsive surfaces arcing downward away from the upper-middle, home row;
    said upper-middle, home row having depressible key switches which include home keys for fingers of a keyboard operator and which are separately operable for actuating alphanumeric characters and other commands;
    said lower-middle row having capacitance-responsive key switches, said capacitance-responsive key switches of the lower middle row being separately operable for actuating alphanumeric characters and other commands and being located within specific, assigned areas of concavely curved capacitance-responsive surfaces sloping downward away from the upper-middle, home row and curving upward toward the lowermost row;
    said lowermost row having depressible key switches which include home keys for thumbs of said keyboard operator and which are separately operable for actuating alphanumeric characters and other commands, and
    means for coupling all key switches with a processing device.

2. The combination according to claim 1 wherein an upper half of the keyboard which contains a uppermost row of capacitance-responsive key switches and the upper-middle, home row of depressible key switches is hinged to the lower half of the keyboard which contains the lower-middle row of capacitance-responsive key switches and the bottom row of depressible key switches such that the upper and lower halves can be folded together.

3. The combination according to claim 1 wherein left and right halves of the keyboard are hinged together such that the left and right halves can be folded together.

4. The combination according to claim 1 wherein a left half and a right half of the keyboard are separately housed,
    and wherein said left half and right half of the keyboard each have an upper section and a lower section,
    and wherein each said upper section contains a portion of the uppermost row of capacitance-responsive key switches and a portion of the upper-middle, home row of depressible key switches,
    and wherein each said lower section contains a portion of the lower-middle row of capacitance-responsive key switches and a portion of the bottom row of depressible key switches,
    and wherein each said upper section is hinged to its corresponding said lower section such that each said upper section and its said corresponding lower section can be folded together,
    and wherein said left half and said right half of the keyboard are each separately attached by way of a pivot to a computerized device including a body, such that said left half and said right half of the keyboard, each with their upper and lower sections folded together, can each be separately rotated back and forth from a storage position within the body of said computerized device to a functioning position, said functioning position being away from the confines of the body of said computerized device such that said left half and said right half of the keyboard can each be unfolded for use with said computerized device.

5. The combination according to claim 1 wherein an engagement of one of the capacitance-responsive key switches causes an audible tone to sound, thus providing feedback to the keyboard operator, indicating that a character or command has been engaged.

6. The combination according to claim 1 wherein an engagement of one of the capacitance-responsive key switches causes a vibration in the keyboard, thus providing feedback to the keyboard operator, indicating that a character or command has been engaged.

7. The combination according to claim 1 wherein said assigned areas of the capacitance-responsive surfaces designated to engage specific characters and commands within said uppermost row of capacitance-responsive key switches and within said lower-middle row of capacitance-responsive key switches can be reprogrammed by the keyboard operator to alter the proximity of said areas to the upper-middle, home row of depressible key switches.

8. The combination according to claim 1 wherein said uppermost and lower-middle rows of capacitance-responsive key switches operate alternately as relative motion cursor positioning devices when such operation is selected.

9. The combination according to claim 1 wherein a wheel housed in the keyboard can be turned to engage a scroll up command and a scroll down command.

10. The combination according to claim 1 wherein the upper-middle, home row of depressible key switches operates alternately as a number pad when such operation is selected by way of a toggle switch.

11. A keyboard for controlling data input of alphanumeric characters and other commands including in combination:
    an uppermost row of key switches;

an upper-middle, home row of key switches;

a lower-middle row of key switches;

a lowermost row of key switches;

said uppermost row having capacitance-responsive key switches, said capacitance-responsive key switches being separately operable for actuating alphanumeric characters and other commands and being located within specific, assigned areas of convexly curved capacitance-responsive surfaces arcing downward away from the upper-middle, home row;

said upper-middle, home row having depressible key switches which include home keys for fingers of a keyboard operator and which are separately operable for actuating alphanumeric characters and other commands;

said lower-middle row having capacitance-responsive key switches, said capacitance-responsive key switches of said lower-middle row being separately operable for actuating alphanumeric characters and other commands and being located within specific, assigned areas of concavely curved capacitance-responsive surfaces sloping downward away from the upper-middle, home row and curving upward toward the lowermost row;

said lowermost row having capacitance-responsive key switches said capacitance-responsive key switches of the lowermost row being separately operable for actuating alphanumeric characters and other commands and which are being located within specific, assigned areas of flat capacitance-responsive surfaces, said flat capacitance-responsive surfaces being located on the side of the keyboard facing the keyboard operator, and means for coupling all key switches with a processing device.

12. The combination according to claim 11 wherein the side of the keyboard facing the keyboard operator and containing the lowermost row of capacitance-responsive key switches is vertical, relative to the horizontal keyboard.

13. The combination according to claim 11 wherein the side of the keyboard facing the keyboard operator and containing the lowermost row of capacitance-responsive key switches slopes at an angle with its bottom edge closer to the typist than its upper edge.

14. The combination according to claim 11 wherein an upper half of the keyboard which contains the uppermost row of capacitance-responsive key switches and the upper-middle, home row of depressible key switches is hinged to a lower half of the keyboard which contains the lower-middle row of capacitance-responsive key switches and the bottom row of capacitance-responsive key switches such that the upper and lower halves can be folded together.

15. The combination according to claim 11 wherein left and right halves of the keyboard are hinged together such that the left and right halves can be folded together.

16. The combination according to claim 11 wherein a left half and a right half of the keyboard are separately housed, and wherein said left half and right half of the keyboard each have an upper section and a lower section, and wherein each said upper section contains a portion of the uppermost row of capacitance-responsive key switches and a portion of the upper-middle, home row of depressible key switches, and wherein each said lower section contains a portion of the lower-middle row of capacitance-responsive key switches and a portion of the bottom row of capacitance-responsive key switches, and wherein each said upper section is hinged to its corresponding said lower section such that each said upper section and its said corresponding lower section can be folded together, and wherein said left half and said right half of the keyboard are each separately attached by way of a pivot to a computerized device, such that said left half and said right half of the keyboard, each with their upper and lower sections folded together, can each be separately rotated back and forth from a storage position within the body of said computerized device to a functioning position, said functioning position being away from the confines of the body of said computerized device such that said left half and said right half of the keyboard can each be unfolded for use with said computerized device.

17. The combination according to claim 11 wherein an engagement of one of the capacitance-responsive key switches causes an audible tone to sound, thus providing feedback to the keyboard operator, indicating that a character or command has been engaged.

18. The combination according to claim 11 wherein an engagement of one of the capacitance-responsive key switches causes a vibration in the keyboard, thus providing feedback to the keyboard operator, indicating that a character or command has been engaged.

19. The combination according to claim 11 wherein said assigned areas of the capacitance-responsive surfaces designated to engage specific characters and commands within said uppermost row of capacitance-responsive key switches and within said lower-middle row of capacitance-responsive key switches can be reprogrammed by the keyboard operator to alter the proximity of said areas to the upper-middle, home row of depressible key switches.

20. The combination according to claim 11 wherein said uppermost and lower-middle rows of capacitance-responsive key switches operate alternately as relative motion cursor positioning devices when such operation is selected.

21. The combination according to claim 11 wherein a wheel housed in the keyboard can be turned to engage a scroll up command and a scroll down command.

22. The combination according to claim 11 wherein the upper-middle, home row of depressible key switches operates alternately as a number pad when such operation is selected by way of a toggle switch.

23. A keyboard for controlling data input of alphanumeric characters and other commands including in combination:

two semi-cylindrical convex surfaces set parallel to each other, an uppermost row of key switches;

an upper-middle, home row of key switches;

a lower-middle row of key switches;

a lowermost row of key switches;

said uppermost row having capacitance-responsive key switches, said capacitance-responsive key switches being separately operable for actuating alphanumeric characters and other commands and being located within specific, assigned areas of a convexly curved capacitance-responsive strip located within the far side, relative to a keyboard operator, of the semi-cylindrical convex surface located further from the keyboard operator;

said upper-middle, home row having depressible key switches which include home keys for fingers of the keyboard operator and which are separately operable for actuating alphanumeric characters and other commands, and wherein said home row of depressible key switches is housed within the near side, relative to the keyboard operator, of the semi-cylindrical surface further from the keyboard operator;

said lower-middle row having capacitance-responsive key switches, said capacitance-responsive key switches of the lower-middle row being separately operable for actuating alphanumeric characters and other commands and being located within specific, assigned areas of the far side, relative to the keyboard operator, of the semi-cylindrical convex surface located closer to the keyboard operator;

said lowermost row having depressible key switches which include home keys for thumbs of the keyboard operator and which are separately operable for actuating alphanumeric characters and other commands, and wherein said lowermost row of depressible key switches is housed within the near side, relative to the keyboard operator, of the semi-cylindrical surface located closer to the keyboard operator, and means for coupling all key switches with a processing device.

24. The combination according to claim 23 wherein the two semi-cylindrical convex surfaces are hinged to each other such that they can be closed together to form an approximately cylindrical shape.

25. The combination according to claim 23 wherein the two semi-cylindrical convex surfaces are hinged to each other such that they can be closed together to form an approximately cylindrical shape, and wherein the hollow space within the approximately cylindrically shaped closed keyboard houses a flexible, extractable, and retractable display screen which can be unfurled from within the approximately cylindrically shaped closed keyboard and which can be used in conjunction with the opened keyboard.

26. The combination according to claim 23 wherein an engagement of one of the capacitance-responsive key switches causes an audible tone to sound, thus providing feedback to the keyboard operator, indicating that a character or command has been engaged.

27. The combination according to claim 23 wherein an engagement of one of the capacitance-responsive key switches causes a vibration in the keyboard, thus providing feedback to the keyboard operator, indicating that a character or command has been engaged.

28. The combination according to claim 23 wherein said assigned areas of the capacitance-responsive surfaces designated to engage specific characters and commands within said uppermost row of capacitance-responsive key switches can be reprogrammed by the keyboard operator to alter the proximity of said areas to the home row of depressible key switches.

29. The combination according to claim 23 wherein said upper and lower-middle rows of capacitance-responsive key switches operate alternately as relative motion cursor positioning devices when such operation is selected.

30. The combination according to claim 23 wherein a wheel housed in the keyboard can be turned to engage a scroll up command and a scroll down command.

31. The combination according to claim 23 wherein the upper-middle, home row of depressible key switches operates alternately as a number pad when such operation is selected by way of a toggle switch.

32. A keyboard for controlling data input of alphanumeric characters and other commands including in combination:

two semi-cylindrical convex surfaces set parallel to each other, an uppermost row of key switches;

an upper-middle, home row of key switches;

a lower-middle row of key switches;

a lowermost row of key switches;

said uppermost row having capacitance-responsive key switches, said capacitance-responsive key switches being separately operable for actuating alphanumeric characters and other commands and being located within specific, assigned areas of the far side, relative to a keyboard operator, of the semi-cylindrical convex surface located further from the keyboard operator;

said upper-middle, home row having depressible key switches which include home keys for fingers of the keyboard operator and which are separately operable for actuating alphanumeric characters and other commands, and wherein said home row of depressible key switches is housed within the near side, relative to the keyboard operator, of the semi-cylindrical surface located further from the keyboard operator;

said lower-middle row having capacitance-responsive key switches, said capacitance-responsive key switches of the lower-middle row being separately operable for actuating alphanumeric characters and other commands and being located within specific, assigned areas of the far side, relative to the keyboard operator, of the semi-cylindrical convex surface located closer to the keyboard operator;

said lowermost row having capacitance-responsive key switches, said capacitance-responsive key switches of the lower-middle row being separately operable for actuating alphanumeric characters and other commands and being located within specific, assigned areas of the near side, relative to the keyboard operator, of the semi-cylindrical convex surface located closer to the keyboard operator, and means for coupling all key switches with a processing device.

33. The combination according to claim 32 wherein the two semi-cylindrical convex surfaces are hinged to each other such that they can be closed together to form an approximately cylindrical shape.

34. The combination according to claim 32 wherein the two semi-cylindrical convex surfaces are hinged to each other such that they can be closed together to form an approximately cylindrical shape, and wherein the hollow space within the approximately cylindrically shaped closed keyboard houses a flexible, extractable, and retractable display screen which can be unfurled from within the approximately cylindrically shaped closed keyboard and which can be used in conjunction with the opened keyboard.

35. The combination according to claim 32 wherein an engagement of one of the capacitance-responsive key switches causes an audible tone to sound, thus providing feedback to the keyboard operator, indicating that a character or command has been engaged.

36. The combination according to claim 32 wherein an engagement of one of the capacitance-responsive key switches causes a vibration in the keyboard, thus providing feedback to the keyboard operator, indicating that a character or command has been engaged.

37. The combination according to claim 32 wherein said assigned areas of the capacitance-responsive surfaces designated to engage specific characters and commands within said uppermost row of capacitance-responsive key switches can be reprogrammed by the keyboard operator to alter the proximity of said areas to the home row of depressible key switches.

38. The combination according to claim 32 wherein said uppermost, lower-middle, and lowermost rows of capacitance-responsive key switches operate alternately as relative motion cursor positioning devices when such operation is selected.

39. The combination according to claim 32 wherein a wheel housed in the keyboard can be turned to engage a scroll up command and a scroll down command.

40. The combination according to claim 32 wherein the upper-middle, home row of depressible key switches operates alternately as a number pad when such operation is selected by way of a toggle switch.

* * * * *